US008854347B2

(12) United States Patent
Park et al.

(10) Patent No.: US 8,854,347 B2
(45) Date of Patent: *Oct. 7, 2014

(54) ORGANIC LIGHT EMITTING DISPLAY DEVICE

(75) Inventors: Yong-Sung Park, Yongin (KR);
Chul-Kyu Kang, Yongin (KR);
Dong-Wook Park, Yongin (KR);
Bo-Yong Chung, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 249 days.

This patent is subject to a terminal disclaimer.

(21) Appl. No.: 13/273,079

(22) Filed: Oct. 13, 2011

(65) Prior Publication Data

US 2012/0105399 A1    May 3, 2012

(30) Foreign Application Priority Data

Oct. 28, 2010   (KR) .................. 10-2010-0105796

(51) Int. Cl.
*G06F 3/038*   (2013.01)
*G09G 3/30*    (2006.01)
*G09G 3/32*    (2006.01)

(52) U.S. Cl.
CPC .............. *G06F 3/038* (2013.01); *G09G 3/3266* (2013.01); *G09G 2300/0426* (2013.01); *G09G 3/30* (2013.01); *G09G 2300/0408* (2013.01)
USPC ................ 345/206; 345/76; 345/80; 345/204

(58) Field of Classification Search
USPC ............... 345/204–214, 55, 76–107, 690, 30, 345/419; 349/139; 714/731; 315/169.1; 313/305
See application file for complete search history.

(56) References Cited

U.S. PATENT DOCUMENTS

| 7,079,093 | B2 * | 7/2006 | Sun .................................. 345/82 |
| 7,714,818 | B2 * | 5/2010 | Osame et al. .................... 345/82 |
| 7,777,713 | B2 * | 8/2010 | Hashimoto et al. ............ 345/100 |
| 7,903,127 | B2 * | 3/2011 | Kwon ........................... 345/690 |
| 7,965,272 | B2 * | 6/2011 | Eom ............................... 345/98 |
| 8,482,555 | B2 * | 7/2013 | Jeon et al. ...................... 345/213 |
| 2006/0248421 | A1 * | 11/2006 | Choi ............................ 714/731 |
| 2007/0063950 | A1 * | 3/2007 | Shin ............................... 345/92 |
| 2009/0219230 | A1 * | 9/2009 | Yamamoto et al. ............. 345/76 |
| 2009/0219233 | A1 * | 9/2009 | Park ............................... 345/80 |

(Continued)

FOREIGN PATENT DOCUMENTS

| KR | 10-2007-0120269 A | 12/2007 |
| KR | 10-2008-0050706 A | 6/2008 |
| KR | 10-2009-0126578   | * 12/2009 |
| KR | 10-2010-0009386 A | 1/2010 |

*Primary Examiner* — Dwayne Bost
*Assistant Examiner* — Darlene M Ritchie
(74) *Attorney, Agent, or Firm* — Christie, Parker & Hale, LLP

(57) ABSTRACT

An organic light emitting display device for improving the yield and for reducing or minimizing manufacturing costs. The organic light emitting display device includes: a data driver coupled to data lines that are formed on the panel; a scan driver mounted on the panel and coupled to scan lines that are formed on the panel; input lines for receiving clock signals from the outside; first connecting lines overlapped with a cathode electrode and electrically coupled to the input lines and for supplying the clock signals to the scan driver; second connecting lines electrically coupled to the input lines; and third connecting lines for electrically coupling the first connecting lines to the second connecting lines.

8 Claims, 6 Drawing Sheets

(56) References Cited

U.S. PATENT DOCUMENTS

| | | | |
|---|---|---|---|
| 2009/0251404 A1* | 10/2009 | Hwang et al. | 345/107 |
| 2010/0013743 A1* | 1/2010 | Cho et al. | 345/55 |
| 2010/0220079 A1* | 9/2010 | Bang et al. | 345/204 |
| 2011/0063267 A1* | 3/2011 | Sim et al. | 345/205 |
| 2011/0148853 A1* | 6/2011 | Ko | 345/213 |
| 2011/0205196 A1* | 8/2011 | Okuno et al. | 345/204 |
| 2012/0154456 A1* | 6/2012 | Kimura et al. | 345/690 |

* cited by examiner

ORGANIC LIGHT EMITTING DISPLAY DEVICE

CROSS-REFERENCE TO RELATED APPLICATION

This application claims priority to and the benefit of Korean Patent Application No. 10-2010-0105796, filed on Oct. 28, 2010, in the Korean Intellectual Property Office, the entire content of which is incorporated herein by reference.

BACKGROUND

1. Field

The following description relates to an organic light emitting display device, and more particularly, to an organic light emitting display device for improving the yield and for reducing (or minimizing) manufacturing costs.

2. Description of the Related Art

Recently, various flat panel display devices that are lighter in weight and smaller in volume than a comparable cathode ray tube have been developed. Examples of these various flat panel displays include a liquid crystal display (LCD), a field emission display (FED), a plasma display panel (PDP), and an organic light emitting display.

The organic light emitting display is a device for displaying an image using an organic light emitting diode for emitting light when electrons and holes are re-combined, and has a rapid response and low power consumption.

SUMMARY

Accordingly, an aspect of an embodiment of the present invention is directed toward an organic light emitting display device for improving the yield and for reducing (or minimizing) manufacturing costs.

In order to achieve the foregoing and/or other aspects of the present invention, an organic light emitting display device is provided to include: a panel; a data driver coupled to data lines that are formed on the panel; a scan driver mounted on the panel and coupled to scan lines that are formed on the panel; input lines for receiving clock signals from the outside; first connecting lines overlapped with a cathode electrode and electrically coupled to the input lines and for supplying the clock signals to the scan driver; second connecting lines electrically coupled to the input lines; and third connecting lines for electrically coupling the first connecting lines to the second connecting lines.

In certain embodiments, the third connecting lines electrically couple the second connecting lines to the first connecting lines to receive each of the clock signals at two or more nodes. The second connecting lines are not overlapped with the cathode electrode. The input lines receive the clock signals through a channel of a data integrated circuit forming the data driver. The organic light emitting display device further includes a buffer formed on each of the third connecting lines and configured to supply the clock signals from the second connecting lines to the first connecting lines.

The scan driver is coupled to an ith (i is an odd number or an even number) scan line of the scan lines formed on the panel. The organic light emitting display device further includes a second scan driver formed on the panel and coupled to an (i+1)th scan line of the scan lines. The organic light emitting display device further includes: second input lines for receiving the clock signals from the outside; fourth connecting lines overlapped with the cathode electrode and electrically coupled to the second input lines to supply the clock signals to the second scan driver; fifth connecting lines not overlapped with the cathode electrode and electrically coupled to the second input lines; and sixth connecting lines for electrically coupling the fourth connecting lines to the fifth connecting lines. The sixth connecting lines electrically couple the fourth connecting lines to the fifth connecting lines to receive each of the clock signals at two or more nodes.

According to the organic light emitting display device of embodiments of the present invention, since the clock signals are additionally supplied using the connecting lines that are not overlapped with the cathode electrode, delay of the clock signals may be reduced (or minimized). Especially, when the connecting lines without being overlapped with the cathode electrode are additionally formed, since the FPC is removed, the yield is improved and manufacturing costs may be reduced (or minimized).

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
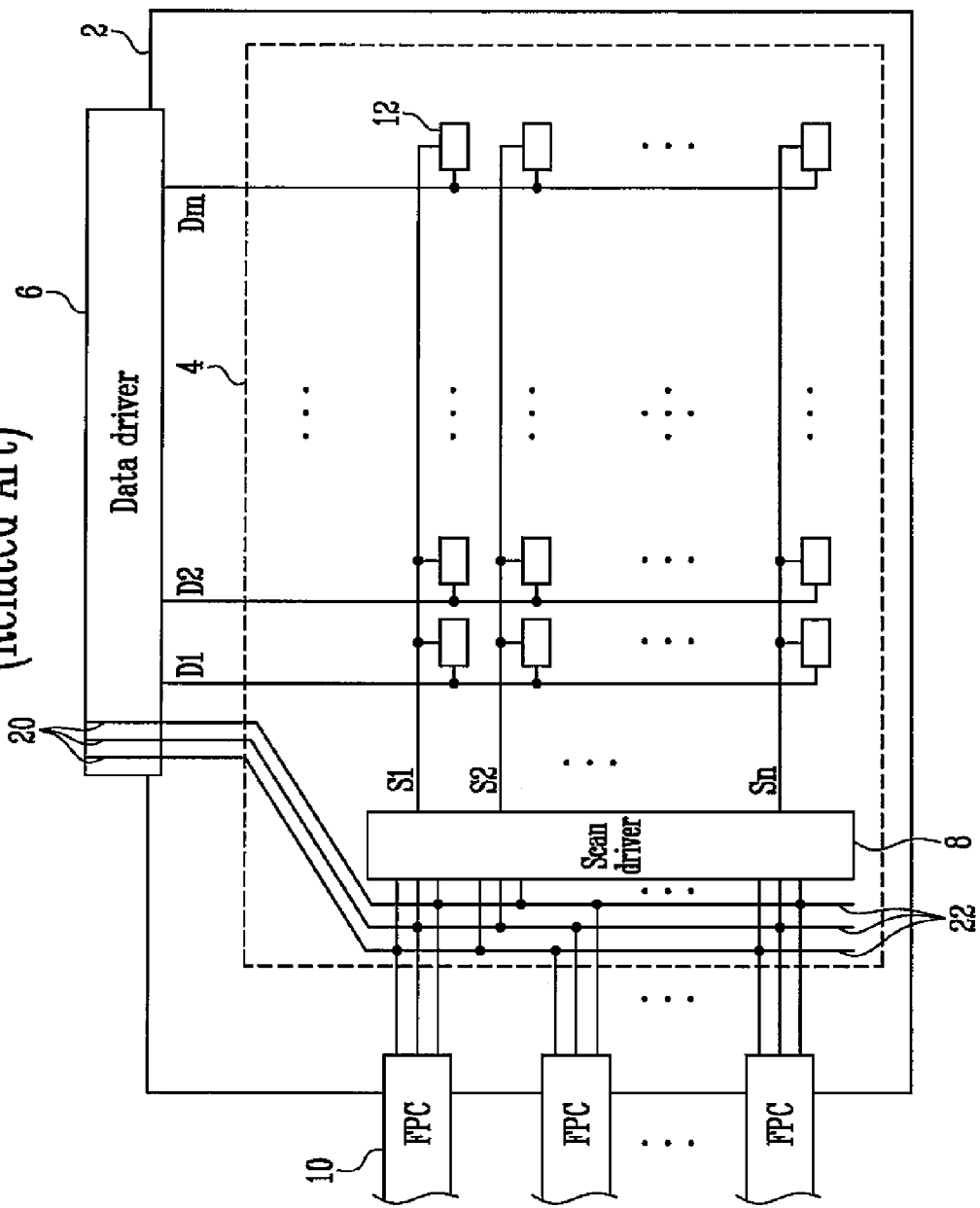
FIG. 1 is a view illustrating an existing organic light emitting display device.

Hereinafter, certain exemplary embodiments according to the present invention will be described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout.

FIG. 1 is a view illustrating a comparable organic light emitting display device.

Referring to FIG. 1, the comparable organic light emitting display device includes a panel 2, a data driver 6, a scan driver 8, and pixels 12.

The pixels 12 are formed at intersections (or crossings) between scan lines S1 to Sn and data lines D1 to Dm. The pixels 12 are selected when scan signals are supplied, charge (or store) a voltage corresponding to data signals, and emit light of set (or predetermined) brightness in response to the charged voltage.

The data driver 6 supplies the data signals to the data lines D1 to Dm when the scan signals are supplied from the scan driver 8.

The scan driver 8 supplies the scan signals to the scan lines S1 to Sn sequentially. Here, the scan driver 8 is formed to be mounted on the panel 2 when the pixels 12 are formed. To this end, the scan driver 8 includes input lines 20 and connecting lines 22 positioned between the input lines 20 and the scan driver 8.

The input lines 20 receive clock signals from a printed circuit board. The connecting lines 22 are electrically coupled to the input lines 20 respectively and formed parallel to the data lines D1 to Dm to supply the clock signals to various stages included in the scan driver 8.

Here, the connecting lines 22 formed in the panel 2 are positioned to be overlapped with a cathode electrode 4. When the cathode electrode 4 is overlapped with the connecting lines 22, the connecting lines 22 and the cathode electrode 4 form capacitors so that a delay of the clock signals occurs. In order to solve the problem, according to the comparable embodiment, a plurality of flexible printed circuits (FPC) are installed at set or predetermined intervals to be coupled to the panel 2 and the clock signals are additionally supplied to the connecting lines 22 using the FPC. However, when the clock signals are additionally supplied using the FPC, manufacturing costs are increased and the yield is lowered.

Hereinafter, the embodiments of the present invention will be described such that those skilled in the art can easily practice the present invention in detail with reference to FIGS. 2 to 6.

Figure 2:
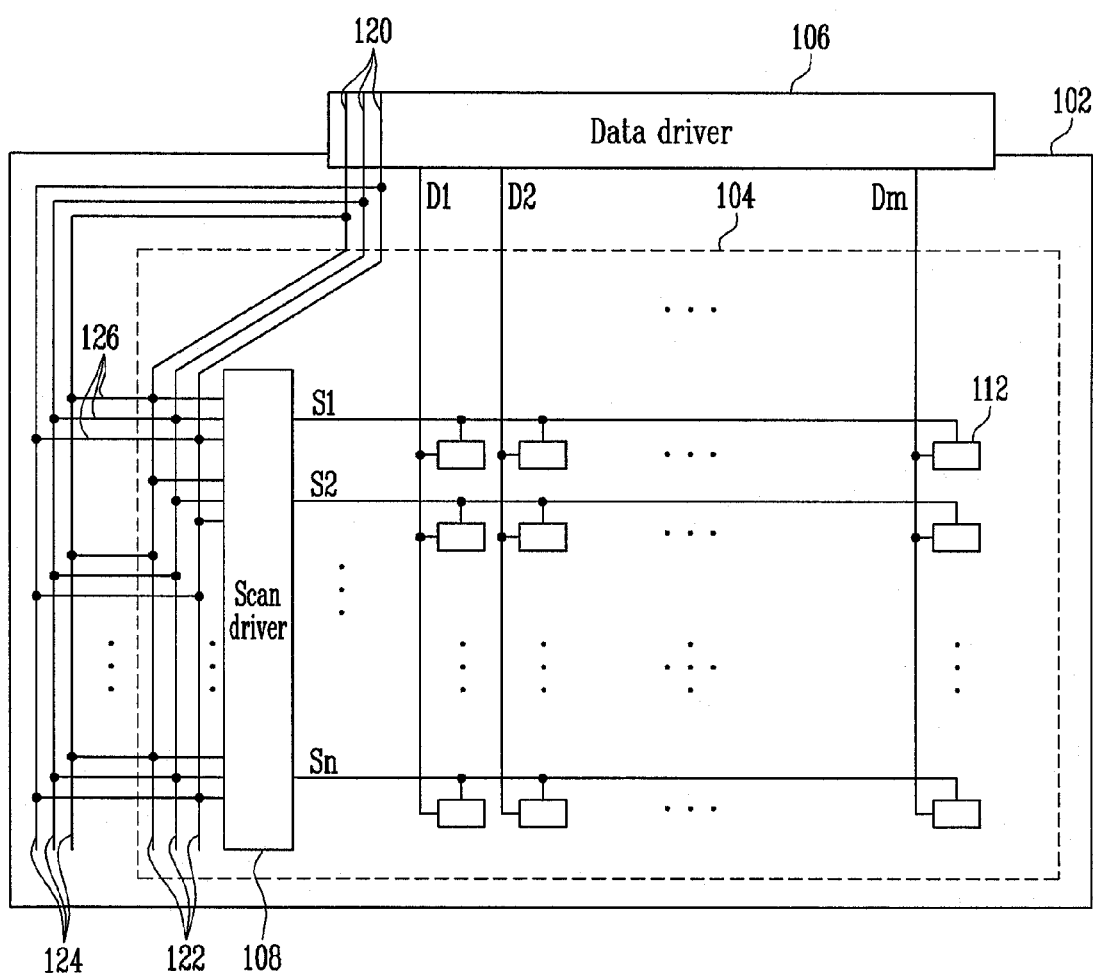
FIG. 2 is a view illustrating an organic light emitting display device according to a first embodiment of the present invention.

FIG. 2 is a view illustrating an organic light emitting display device according to a first embodiment of the present invention.

Referring to FIG. 2, the organic light emitting display device according to the first embodiment of the present invention includes a panel 102, a data driver 106, a scan driver 108, and pixels 112.

The pixels 112 are formed at crossings (or intersections) between scan lines S1 to Sn and data lines D1 to Dm respectively. The pixels 112 are selected when scan signals are supplied, charge (or store) a voltage corresponding to data signals, and emit light of predetermined brightness in response to the charged voltage.

The data driver 106 supplies the data signals to the data lines D1 to Dm when the scan signals are supplied from the scan driver 108. Here, the data driver 106 is made into a plurality of data integrated circuits. Each of the data integrated circuits includes j (j is a natural number) channels such that j data signals may be supplied.

The scan driver 108 sequentially supplies the scan signals to the scan lines S1 to Sn. Here, the scan driver 108 is mounted on the panel 102 when the pixels 112 are formed. The scan driver 108 mounted on the panel 102 receives clock signals supplied from the outside. To this end, on the panel 102, input lines 120, first connecting lines 122, second connecting lines 124, and third connecting lines 126 are formed.

The input lines 120 receive the clock signals from a printed circuit board through a channel of the data integrated circuits that are included in the data driver 106. More specifically, some channels of the data integrated circuits having j channels are not used. The input lines 120 receive the clock signals from the printed circuit board via the unused channels.

Figure 3:
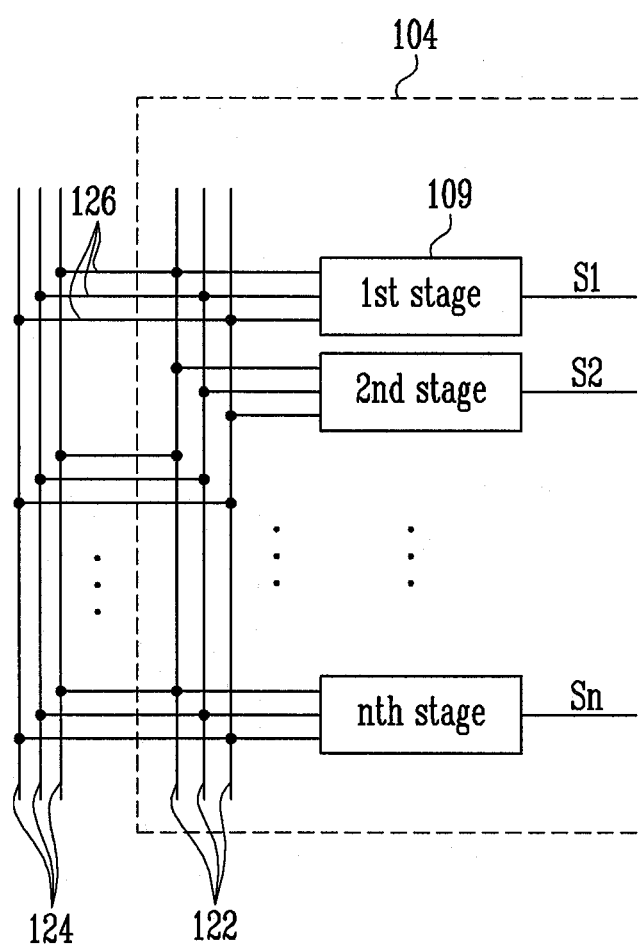
FIG. 3 is a view illustrating a scan driver of FIG. 2.

The first connecting lines 122 are formed parallel to the scan driver 108 and electrically coupled to the input lines 120. The first connecting lines 122 supply the clock signals from the input lines 120 to the scan driver 108. In more detail, the scan driver 108, as illustrated in FIG. 3, includes n stages 109 respectively coupled to the scan lines S1 to Sn. The first connecting lines 122 supply the clock signals to the respective stages 109 such that the scan signals may be generated from the stages 109.

FIG. 3 illustrates that each of the stages 109 is coupled to the same first connecting lines 122, but the present invention is not limited thereto. For example, different clock signals may be supplied to odd order or even order stages 109. That is, the present invention may be applied to various suitable forms of scan drivers 108.

Also, since the first connecting lines 122 are electrically coupled to the stages 109 for forming the scan driver 108, the first connecting lines 122 are formed close to the scan driver 108. In this case, the first connecting lines 122 positioned close to the scan driver 108 are overlapped with a cathode electrode 104.

The second connecting lines 124 are formed parallel to the scan driver 108 and electrically coupled to the input lines 120. The second connecting lines 124 are electrically coupled to the first connecting lines 122 via third connecting lines 126. Here, the third connecting lines 126 electrically couple the second connecting lines 124 to the first connecting lines 122 to receive each of the specific clock signals at two or more nodes. When the second connecting lines 124 and the first connecting lines 122 configured to receive same clock signals are electrically coupled to each other, resistance of the first connecting lines 122 is lowered so that delay of the clock signals may be reduced (or minimized).

Especially, the second connecting lines 124 of an embodiment of the present invention are not overlapped with the cathode electrode 104. In this case, the second connecting lines 124 do not overlap the cathode electrode and do not form capacitors with the cathode electrode and as a result delay of the clock signals is reduced (or minimized). Therefore, delay of the clock signals is reduced (or minimized) at even the first connecting lines 122 configured to receive the clock signals at some node via the second connecting lines 124.

Figure 4:
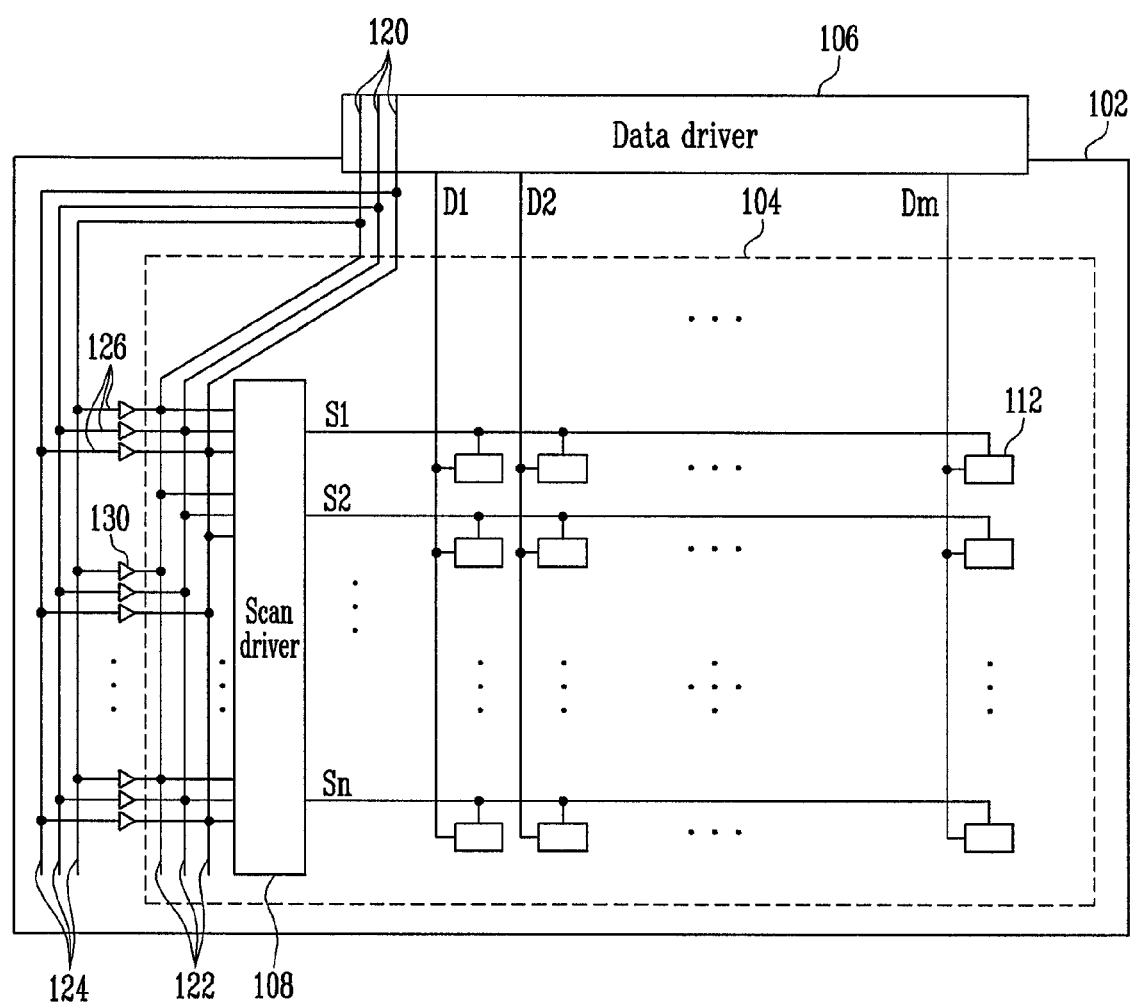
FIG. 4 is a view illustrating an organic light emitting display device according to a second embodiment of the present invention.

FIG. 4 is a view illustrating an organic light emitting display device according to a second embodiment of the present invention. In the description with reference to FIG. 4, same reference numerals are assigned to same elements as illustrated in FIG. 2 and detail description will be omitted.

Referring to FIG. 4, the organic light emitting display device according to the second embodiment of the present invention further includes buffers 130 formed between the first connecting lines 122 and the second connecting lines 124, that is, at the respectively third connecting lines 126. The buffers 130 deliver the clock signals from the second connecting lines 124 to the first connecting lines 122. The buffers 130 may reduce (or minimize) crush of the clock signals and then may guarantee driving stability.

Figure 5:
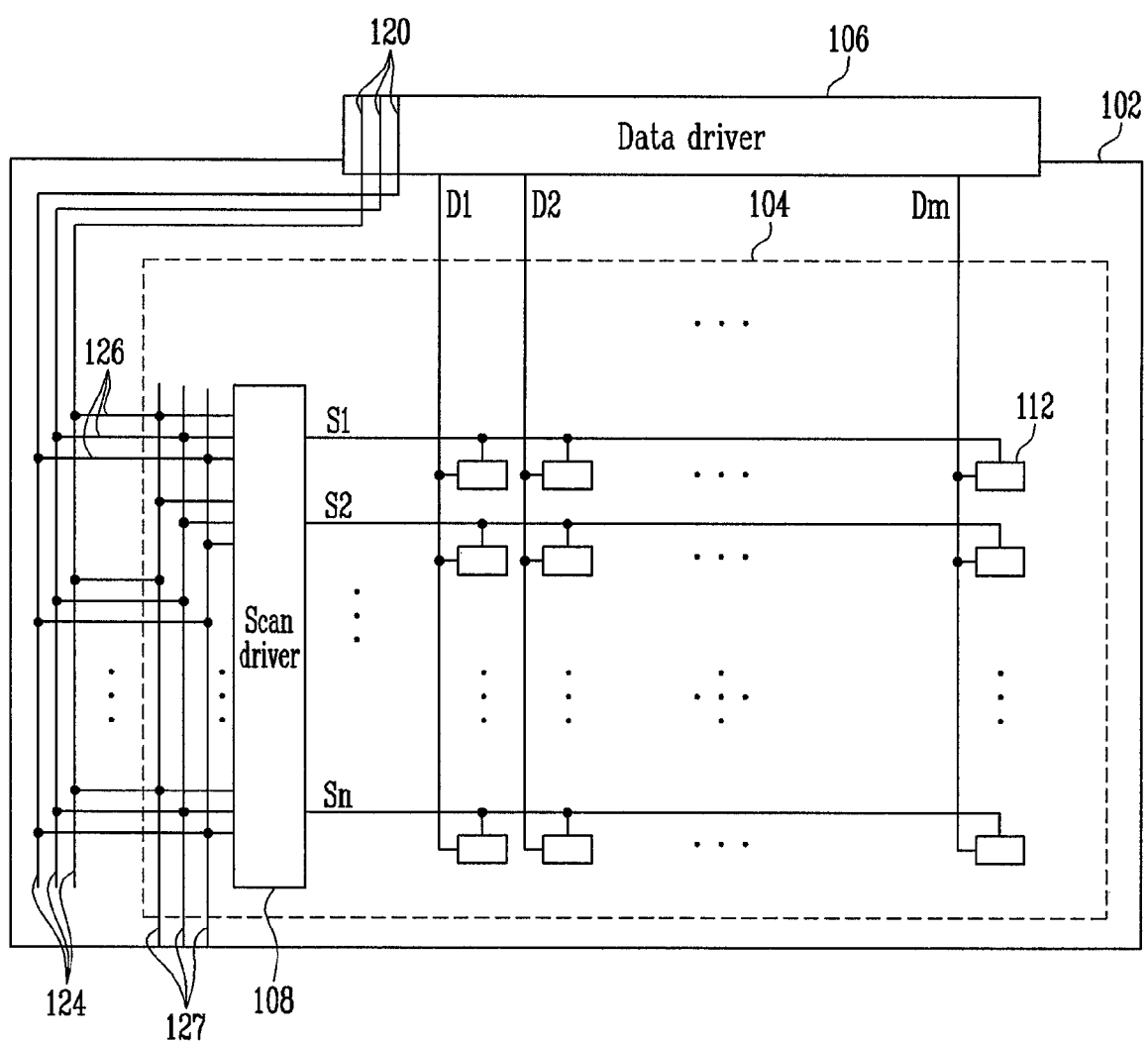
FIG. 5 is a view illustrating an organic light emitting display device according to a third embodiment of the present invention.

FIG. 5 is a view illustrating an organic light emitting display device according to a third embodiment of the present invention. In the description with reference to FIG. 5, same reference numerals are assigned to same elements as illustrated in FIG. 2 and detail description will be omitted.

Referring to FIG. 5, in the organic light emitting display device according to the third embodiment of the present invention, first connecting lines 127 are not coupled with the input lines 120 and receive other clock signals from the outside. In this case, the input lines 120 are coupled to the second connecting lines 124 and supply clock signals to the second connecting lines 124.

Figure 6:
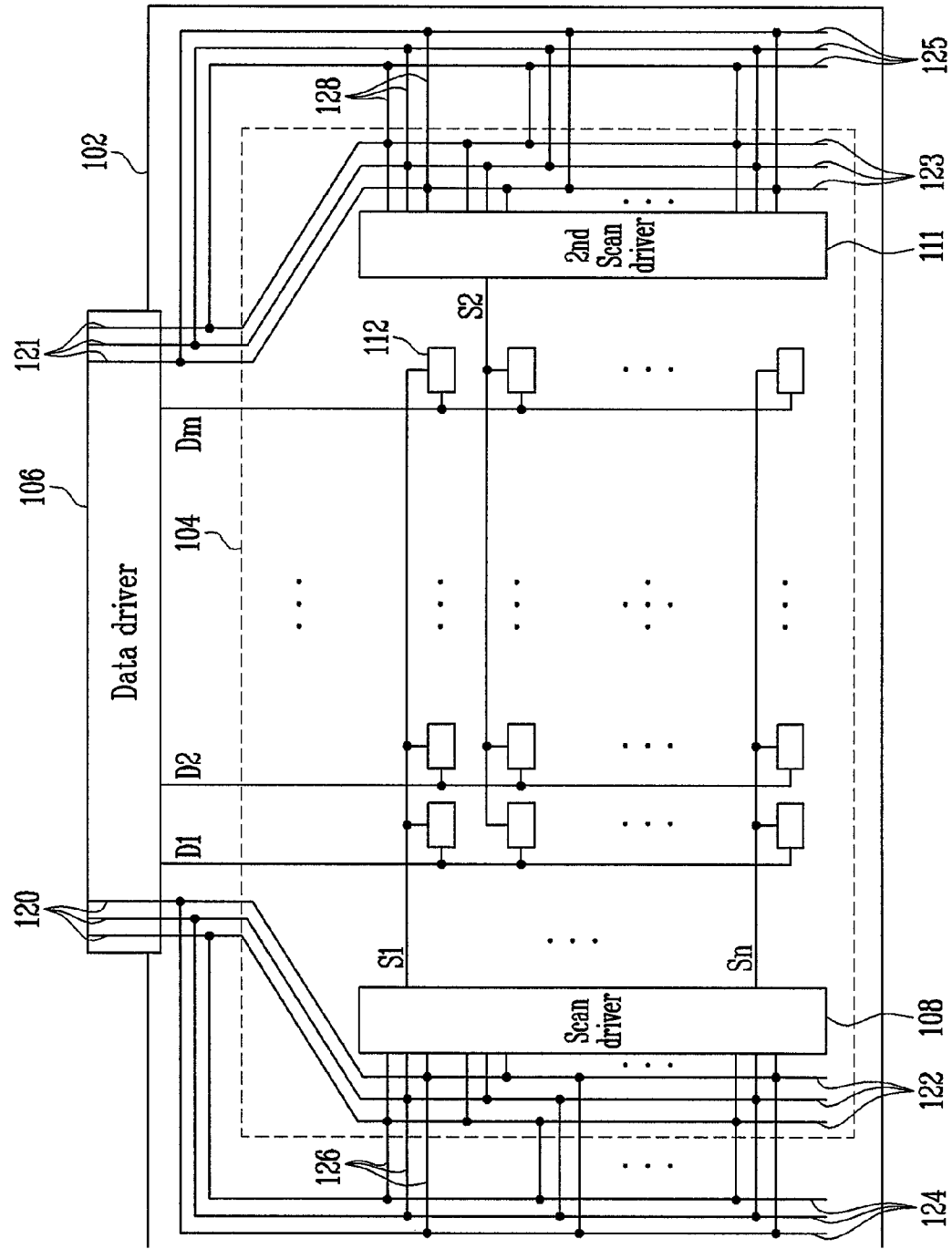
FIG. 6 is a view illustrating an organic light emitting display device according to a fourth embodiment of the present invention.

FIG. 6 is a view illustrating an organic light emitting display device according to a fourth embodiment of the present invention. In the description with reference to FIG. 6, same reference numerals are assigned to same elements as illustrated in FIG. 2 and detail description will be omitted.

Referring to FIG. 6, the organic light emitting display device according to the fourth embodiment of the present invention further includes a second scan driver 111 positioned to face the scan driver 108. The second scan driver 111 supplies the scan signals to even order (or odd order) scan lines S2, . . . . In this case, the scan driver 108 supplies the scan signals to odd order scan lines S1, . . . .

The second scan driver 111 is mounted on the panel. In order to supply the clock signals to the second scan driver 111, the organic light emitting display device further includes second input lines 121, fourth connecting lines 123, fifth connecting lines 125, and sixth connecting lines 128.

The second input lines 121 receive the clock signals from a printed circuit board through a channel of the data integrated circuits included in the data driver 106.

The fourth connecting lines 123 are formed parallel to the second scan driver 111 and electrically coupled to the second input lines 121. The fourth connecting lines 123 supply the clock signals from the second input lines 121 to the second scan driver 111. Here, the fourth connecting lines 123 are overlapped with a cathode electrode 104.

The fifth connecting lines 125 are formed parallel to the second scan driver 111 and electrically coupled to the second input lines 121. The fifth connecting lines 125 are electrically coupled to the fourth connecting lines 123 via the sixth connecting lines 128. Here, the fifth connecting lines 125 are not overlapped with the cathode electrode 104 and thus clock signals delay of which is reduced (or minimized) may be supplied to the fourth connecting lines 123.

The sixth connecting lines 128 electrically connect the fourth connecting lines 123 to receive specific clock signals to the fifth connecting lines 125 to receive the specific clock signals at two more nodes.

The organic light emitting display device according to the fourth embodiment of the present invention is substantially the same as the organic light emitting display device illustrated in FIG. 2 in structure and operative principle except for the scan driver 111 and the connecting lines 123, 125, and 128 to be coupled to the scan driver 111.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An organic light emitting display device comprising:
a panel;
a data driver coupled to data lines formed on the panel;
a scan driver mounted on the panel and coupled to scan lines formed on the panel; input lines for receiving clock signals from the outside;
first connecting lines overlapped with a cathode electrode and electrically coupled to the input lines and for supplying the clock signals to the scan driver;
second connecting lines parallel to and alongside the first connecting lines and electrically coupled to the input lines, wherein the second connecting lines are not overlapped with the cathode electrode; and
third connecting lines for electrically coupling the first connecting lines to the second connecting lines.

2. The organic light emitting display device as claimed in claim 1, wherein the third connecting lines electrically couple the second connecting lines to the first connecting lines to receive each of the clock signals at two or more nodes.

3. The organic light emitting display device as claimed in claim 1, wherein the input lines are configured to receive the clock signals through a channel of a data integrated circuit forming the data driver.

4. The organic light emitting display device as claimed in claim 1, further comprising a buffer formed on each of the third connecting lines and configured to supply the clock signals from the second connecting lines to the first connecting lines.

5. The organic light emitting display device as claimed in claim 1, wherein the scan driver is coupled to an ith (i is an odd number or an even number) scan line of the scan lines formed on the panel.

6. The organic light emitting display device as claimed in claim 5, further comprising a second scan driver formed on the panel and coupled to an (i+1)th scan line of the scan lines.

7. The organic light emitting display device as claimed in claim 6, further comprising:
second input lines for receiving the clock signals from the outside;
fourth connecting lines overlapped with the cathode electrode and electrically coupled to the second input lines to supply the clock signals to the second scan driver;
fifth connecting lines not overlapped with the cathode electrode and electrically coupled to the second input lines; and
sixth connecting lines for electrically coupling the fourth connecting lines to the fifth connecting lines.

8. The organic light emitting display device as claimed in claim 7, wherein the sixth connecting lines electrically couple the fourth connecting lines to the fifth connecting lines to receive each of the clock signals at two or more nodes.

* * * * *